US009148479B1

(12) United States Patent
Bhalerao et al.

(10) Patent No.: US 9,148,479 B1
(45) Date of Patent: Sep. 29, 2015

(54) SYSTEMS AND METHODS FOR EFFICIENTLY DETERMINING THE HEALTH OF NODES WITHIN COMPUTER CLUSTERS

(75) Inventors: Anand Bhalerao, Maharashtra (IN); Amit Gaurav, Maharashtra (IN); Amit Haridas Rangari, Maharashtra (IN); Vishal Thakur, Himachal Pradesh (IN)

(73) Assignee: Symantec Corporation, Mountain View, CA (US)

( * ) Notice: Subject to any disclaimer, the term of this patent is extended or adjusted under 35 U.S.C. 154(b) by 852 days.

(21) Appl. No.: 13/363,928

(22) Filed: Feb. 1, 2012

(51) Int. Cl.
G06F 15/173 (2006.01)
H04L 29/08 (2006.01)

(52) U.S. Cl.
CPC ............ *H04L 67/1076* (2013.01); *H04L 67/34* (2013.01)

(58) Field of Classification Search
CPC .......................... H04L 67/1076; G06F 9/545
USPC ........ 714/4, 39, 41, 47.2, 47.1; 709/223, 224, 709/220; 710/74
See application file for complete search history.

(56) References Cited

U.S. PATENT DOCUMENTS

| 6,718,486 | B1* | 4/2004 | Roselli et al. ................... 714/41 |
| 2006/0041644 | A1* | 2/2006 | Henseler ....................... 709/220 |
| 2006/0242453 | A1* | 10/2006 | Kumar et al. ..................... 714/4 |
| 2007/0180077 | A1* | 8/2007 | Letca et al. ................... 709/223 |
| 2009/0144420 | A1* | 6/2009 | Attanasio et al. ............. 709/224 |
| 2011/0283149 | A1* | 11/2011 | Richmond ...................... 714/39 |
| 2012/0159021 | A1* | 6/2012 | Anantha Padmanaban et al. .............................. 710/74 |
| 2012/0254669 | A1* | 10/2012 | Xia et al. ..................... 714/47.2 |

* cited by examiner

*Primary Examiner* — Dustin Nguyen
(74) *Attorney, Agent, or Firm* — ALG Intellectual Property, LLC

(57) ABSTRACT

A computer-implemented method for determining the healthiness of nodes within computer clusters may include (1) identifying a computer cluster that includes a plurality of nodes configured to provide substantially continuous availability of at least one application, (2) identifying at least one operating system kernel installed on at least one of the nodes, (3) configuring the operating system kernel to (a) asynchronously monitor performance of the node and (b) determine, based at least in part on the node's performance, whether the node is sufficiently healthy to execute the application, (4) receiving a notification from the operating system kernel that indicates that the node is not sufficiently healthy to execute the application, and then (5) performing at least one action configured to enable the computer cluster to provide substantially continuous availability of the application despite the unhealthy node. Various other systems, methods, and computer-readable media are also disclosed.

20 Claims, 7 Drawing Sheets

Cluster Information
122

Cluster Configuration: HIGH AVAILABILITY

Nodes Included in Computer Cluster: NODES 202(1)-(N)

Cluster Agents Installed in Computer Cluster: CLUSTER AGENTS 210(1)-(N)

Identifier Associated with Cluster Agents: 7457 AND 3421

Application Running on Cluster: APPLICATION 1

Agent Currently Executing Application: CLUSTER AGENT 210(1)

Healthy Backup Agent(s): CLUSTER AGENT 210(N)

Unhealthy Backup Agent(s): NONE

*FIG. 5*

SYSTEMS AND METHODS FOR EFFICIENTLY DETERMINING THE HEALTH OF NODES WITHIN COMPUTER CLUSTERS

BACKGROUND

In a high-availability configuration, a computer cluster may include multiple nodes configured to provide high availability of at least one application. Such a configuration may be implemented in an effort to ensure that at least one node within the computer cluster is capable of executing the application at any given time. For example, a cluster engine may select a particular node within the computer cluster to execute the application but later determine (whether accurately or in error) that the node is not healthy enough to continue executing the application. In this example, upon determining that the node is not healthy enough to continue executing the application, the cluster engine may direct the application to fail over from the apparently unhealthy node to another node within the computer cluster in an attempt to reduce application downtime.

Unfortunately, while existing cluster technologies may facilitate application failover from one node to another node, such cluster technologies may also suffer from one or more shortcomings and/or inefficiencies that potentially lead to application downtime. For example, existing cluster technologies may implement a heartbeat mechanism in which the nodes within the computer cluster send periodic heartbeats (via a high-availability agent) to the cluster engine to indicate that such nodes are healthy. In this example, if the node executing the application experiences a system failure shortly after sending a heartbeat, the cluster engine may remain unaware of the node's system failure until the next time that the cluster engine is expecting a heartbeat from the node. As a result, the cluster engine may be unable to direct the application to fail over to another node within the computer cluster (potentially leading to application downtime) until the cluster engine determines that the node executing the application failed to send a timely heartbeat.

In some examples, existing cluster technologies may also determine in error that the node executing the application is unhealthy. For example, even though the node executing the application is completely healthy, the node's CPU may become so overloaded that the node is unable to send a timely heartbeat to the cluster engine. In this example, as a result of the node's inability to send a timely heartbeat, the cluster engine may determine in error that the node is not healthy enough to continue executing the application. Upon determining in error that the node is not healthy enough to continue executing the application, the cluster engine may direct the application to fail over from the apparently unhealthy node to another node in an unnecessary attempt to reduce application downtime.

In another example, the cluster engine may queue a heartbeat received from the node executing the application. However, in this example, the cluster engine may become so overloaded that the cluster engine is unable to process the heartbeat received from the node within a predetermined time interval. As a result of the cluster engine's inability to process the heartbeat received from the node within the predetermined time interval, the cluster engine may determine in error that the node is not healthy enough to continue executing the application. Upon determining in error that the node is not healthy enough to continue executing the application, the cluster engine may direct the application to fail over from the apparently unhealthy node to another node in an unnecessary attempt to reduce application downtime.

As such, the instant disclosure identifies a need for systems and methods for efficiently and accurately determining the healthiness of nodes within computer clusters to avoid (or at least further reduce) application downtime.

SUMMARY

As will be described in greater detail below, the instant disclosure generally relates to systems and methods for efficiently and accurately efficiently determining the health of nodes within computer clusters to avoid (or at least further reduce) application downtime. In one example, a computer-implemented method for accomplishing such a task may include (1) identifying a computer cluster that includes a plurality of nodes configured to provide substantially continuous availability of at least one application, (2) identifying at least one operating system kernel installed on at least one of the nodes within the computer cluster, (3) configuring the operating system kernel installed on the node to (a) asynchronously monitor performance of the node and (b) determine, based at least in part on the node's performance, whether the node is sufficiently healthy to execute the application, (4) receiving, after configuring the operating system kernel installed on the node, a notification from the operating system kernel that indicates that the node is not sufficiently healthy to execute the application, and then (5) performing, in response to receiving the notification, at least one action configured to enable the computer cluster to provide substantially continuous availability of the application despite the unhealthy node.

Examples of this action include, without limitation, restarting at least one cluster agent installed on the node in an attempt to restore the cluster agent's health, preventing the unhealthy node from continuing to execute the application, selecting at least one different node within the computer cluster to begin executing the application, and/or ensuring that the unhealthy node is not selected to execute the application until the node becomes sufficiently healthy to execute the application.

In some examples, the method may also include identifying a cluster engine configured to control which of the nodes is to execute the application within the computer cluster and identifying at least one cluster agent installed on the node that enables the cluster engine to control execution of the application by the node. In such examples, the method may further include using the cluster engine to (1) configure the operating system kernel installed on the node, (2) receive the notification from the operating system kernel, and/or (3) perform the action in response to receiving the notification.

In some examples, the method may also include configuring the operating system kernel to asynchronously monitor the cluster agent's health and determine, based at least in part on the cluster agent's health, whether the node is sufficiently healthy to execute the application. In addition, the method may include identifying an identifier associated with the cluster agent installed on the node and registering the cluster agent's identifier with the operating system kernel to prompt the operating system kernel to asynchronously monitor the cluster agent's health.

In some examples, the method may also include identifying a polling mechanism installed on the node and configuring the polling mechanism to periodically monitor the node's performance by checking, at a predetermined interval of time, for an unhealthy condition in which a plurality of processes initiated on the node are waiting for at least one resource to be released by one another. In such examples, the method may further include determining, based at least in part on the check for the unhealthy condition, whether the node is experiencing the unhealthy condition.

In some examples, the method may also include further configuring the operating system kernel to monitor an amount of processes being executed by the node and determine whether the amount of processes being executed by the node is above a predetermined threshold. In such examples, the method may further include receiving a different notification from the operating system kernel that indicates that the amount of processes being executed by the node is above the predetermined threshold and then dynamically adjusting the predetermined interval of time at which the polling mechanism checks for the unhealthy condition in response to receiving the different notification.

In one embodiment, a system for implementing the above-described method may include (1) an identification module programmed to (a) identify a computer cluster that includes a plurality of nodes configured to provide substantially continuous availability of at least one application and (b) identify at least one operating system kernel installed on at least one of the nodes within the computer cluster and (2) a cluster engine programmed to (a) configure the operating system kernel installed on the node to (i) asynchronously monitor performance of the node and (ii) determine, based at least in part on the node's performance, whether the node is sufficiently healthy to execute the application, (b) receive, after configuring the operating system kernel, a notification from the operating system kernel that indicates that the node is not sufficiently healthy to execute the application, and (c) perform, in response to receiving the notification, at least one action configured to enable the computer cluster to provide substantially continuous availability of the application despite the unhealthy node.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a computer cluster that includes a plurality of nodes configured to provide substantially continuous availability of at least one application, (2) identify at least one operating system kernel installed on at least one of the nodes within the computer cluster, (3) configure the operating system kernel installed on the node to (a) asynchronously monitor performance of the node and (b) determine, based at least in part on the node's performance, whether the node is sufficiently healthy to execute the application, (4) receive, after configuring the operating system kernel installed on the node, a notification from the operating system kernel that indicates that the node is not sufficiently healthy to execute the application, and then (5) perform, in response to receiving the notification, at least one action configured to enable the computer cluster to provide substantially continuous availability of the application despite the unhealthy node.

As will be explained in greater detail below, by configuring operating system kernels installed on nodes within a computer cluster to asynchronously monitor performance of the nodes and determine whether the nodes are sufficiently healthy to execute an application, the various systems and methods described herein may enable a cluster engine to nearly instantaneously detect system failures experienced by the nodes instead of waiting for missing periodic heartbeats from such failed nodes. In addition, by so configuring the operating system kernels installed on the nodes within the computer cluster, these systems and methods may help the cluster engine to avoid misdiagnosing the nodes as unhealthy in the event that (1) a healthy node's CPU becomes so overloaded that the healthy node is unable to send a timely heartbeat to the cluster engine or (2) the cluster engine becomes so overloaded that the cluster engine is unable to process a heartbeat received from a healthy node within a predetermined time interval.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of exemplary cluster information.

Figure 1:
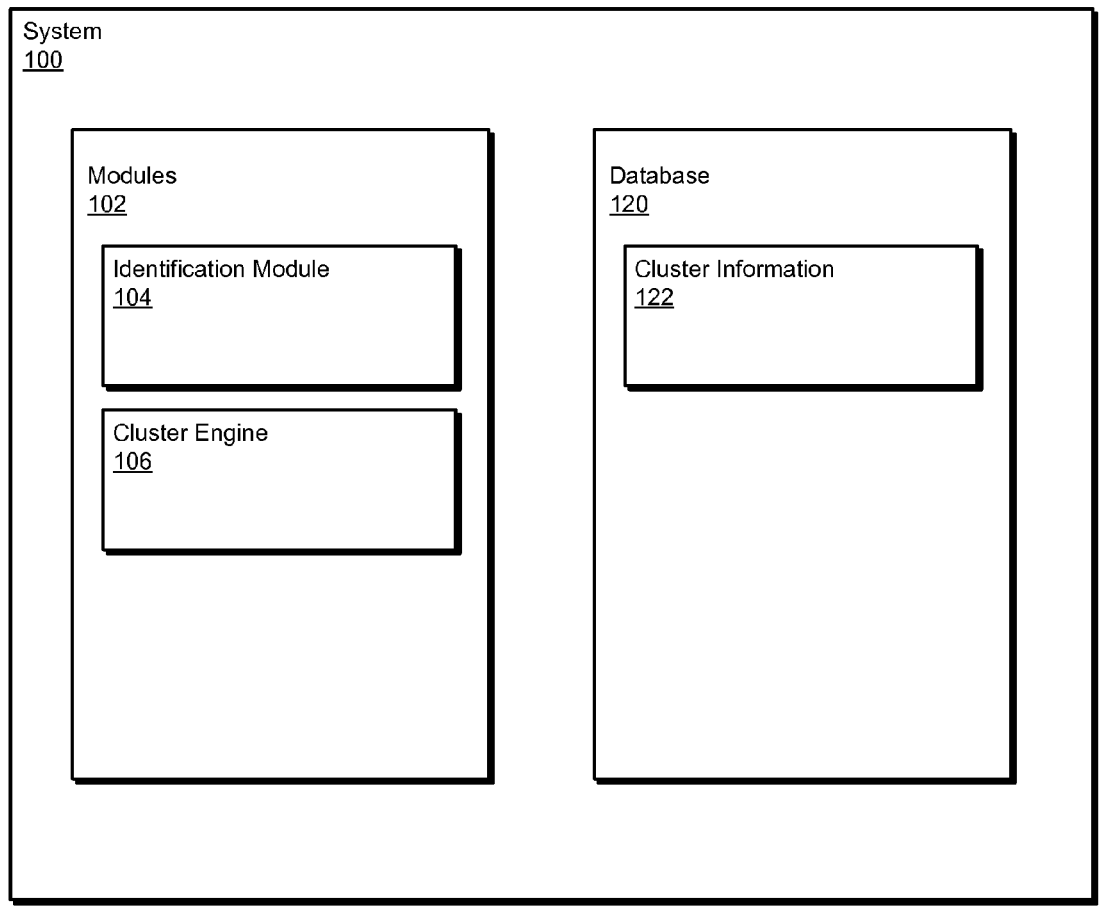
FIG. 1 is a block diagram of an exemplary system for efficiently determining the health of nodes within computer clusters.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
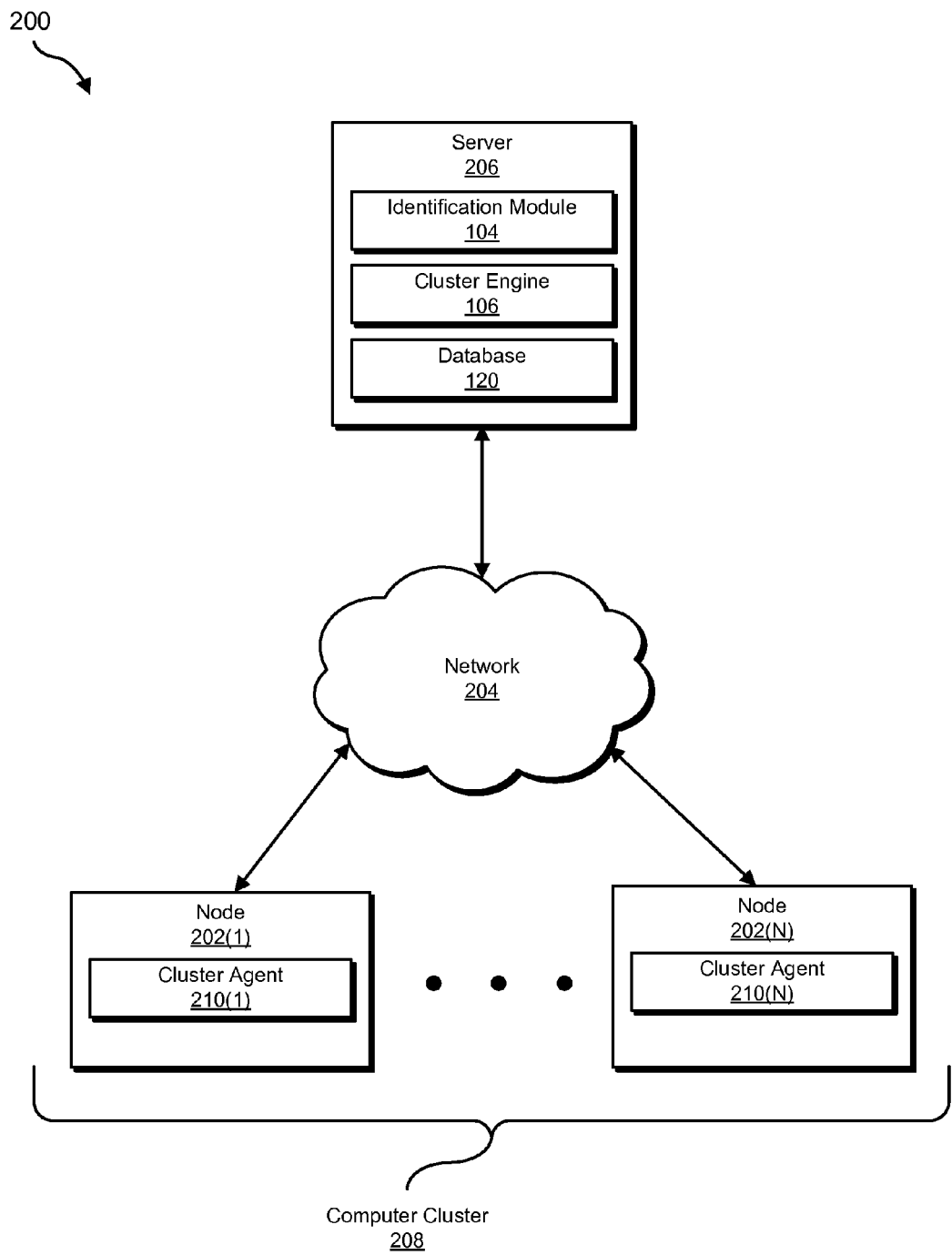
FIG. 2 is a block diagram of an exemplary system for efficiently determining the health of nodes within computer clusters.
Figure 3:
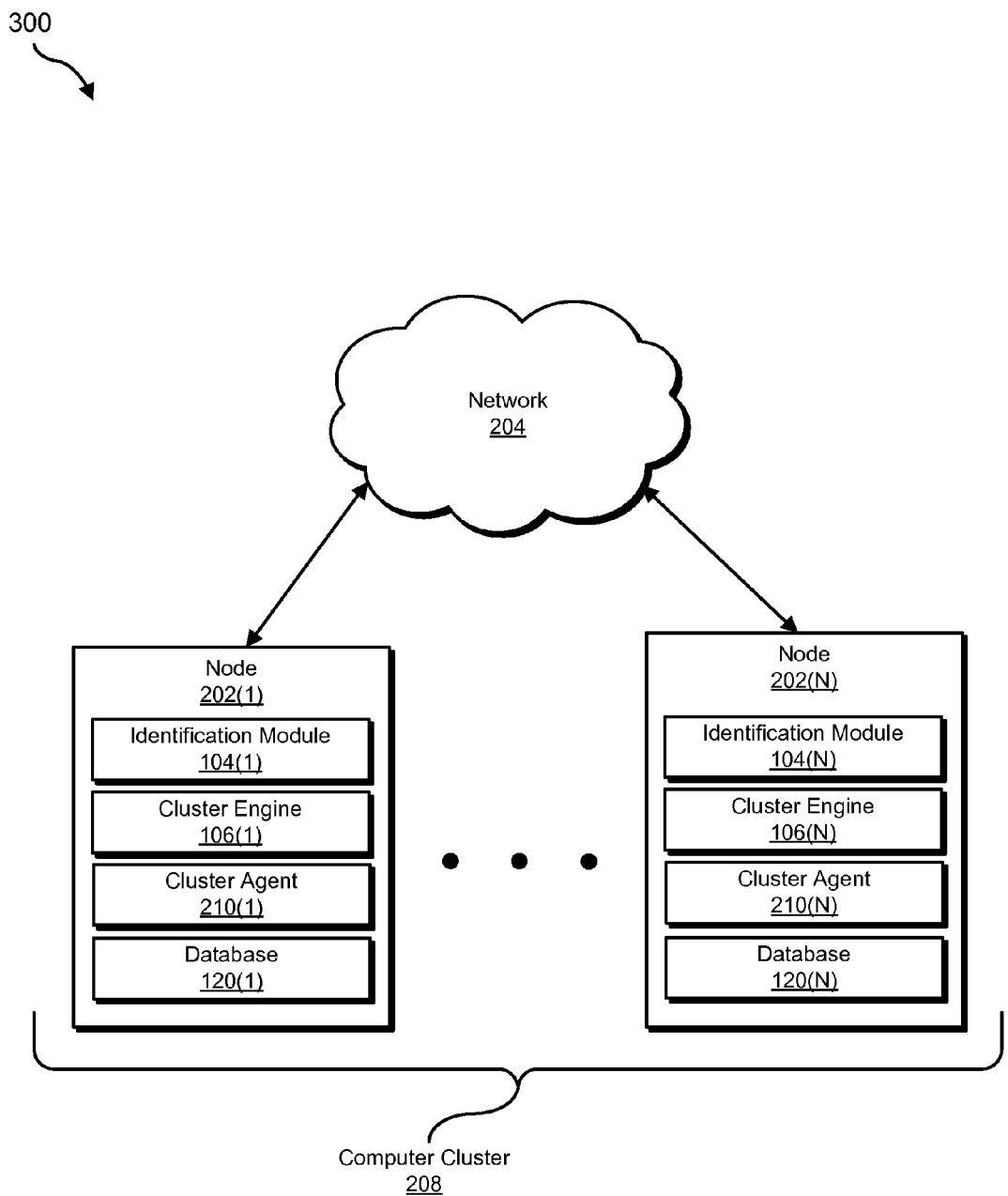
FIG. 3 is a block diagram of an exemplary system for efficiently determining the health of nodes within computer clusters.

The following will provide, with reference to FIGS. 1-3, detailed descriptions of exemplary systems for efficiently determining the health of nodes within computer clusters. Detailed descriptions of corresponding computer-implemented methods will also be provided in connection with FIG. 4, and detailed descriptions of exemplary cluster information will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for efficiently determining the health of nodes within computer clusters. As illustrated in this figure, exemplary system 100 may include one or more modules 102 for performing one or more tasks. For example, and as will be explained in greater detail below, exemplary system 100 may include an identification module 104 programmed to (1) identify a computer cluster that includes a plurality of nodes configured to provide substantially continuous availability of at least one application and (2) identify at least one operating system kernel installed on at least one of the nodes within the computer cluster.

Exemplary system 100 may also include a cluster engine 106 programmed to (1) configure the operating system kernel installed on the node to (a) asynchronously monitor performance of the node and (b) determine, based at least in part on the node's performance, whether the node is sufficiently healthy to execute the application, (b) receive, after configuring the operating system kernel, a notification from the operating system kernel that indicates that the node is not sufficiently healthy to execute the application, and (c) perform, in response to receiving the notification, at least one action configured to enable the computer cluster to provide substantially continuous availability of the application despite the unhealthy node. Although illustrated as separate elements, one or more of modules 102 in FIG. 1 may represent portions of a single module or application (such as high-availability cluster software (e.g., SYMANTEC'S VERITAS CLUSTER SERVER)).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., nodes 202(1)-(N) and/or server 206), the devices illustrated in FIG. 3 (e.g., nodes 202(1)-(N)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. For example, database 120 may be configured to store any type or form of information associated with a computer cluster. In this example, database 120 may be configured to store cluster information 122 that identifies the configuration of the computer cluster and the node within the computer cluster that is currently executing the application.

Database 120 may represent portions of a single database or computing device or a plurality of databases or computing devices. For example, database 120 may represent a portion of server 206 in FIG. 2, nodes 202(1)-(N) in FIG. 3, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, nodes 202(1)-(N) in FIG. 3, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may represent a computer cluster 208 that includes nodes 202(1)-(N) in communication with a server 206 via a network 204. In addition, nodes 202(1)-(N) may include cluster agents 210(1)-(N).

In one embodiment, one or more of modules 102 from FIG. 1 may, when executed by at least one processor, enable server 206 or at least one of nodes 202(1)-(N) to determine the healthiness of nodes 202(1)-(N) by (1) identifying computer cluster 208 that includes nodes 202(1)-(N) configured to provide substantially continuous availability of at least one application, (2) identifying at least one operating system kernel installed on at least one of nodes 202(1)-(N) within computer cluster 208, (3) configuring the operating system kernel to (a) asynchronously monitor the node's performance and (b) determine, based at least in part on the node's performance, whether the node is sufficiently healthy to execute the application, (4) receiving, after configuring the operating system kernel, a notification from the operating system kernel that indicates that the node is not sufficiently healthy to execute the application, and then (5) performing, in response to receiving the notification, at least one action configured to enable computer cluster 208 to provide substantially continuous availability of the application despite the unhealthy node.

Although FIG. 2 illustrates an exemplary implementation of system 100, various other implementations of system 100 may also be deployed. For example, as illustrated in FIG. 3, system 300 may represent a computer cluster 208 that includes nodes 202(1)-(N) in communication with one another via network 204. In this example, nodes 202(1)-(N) may include modules 102 (e.g., identification modules 104 (1)-(N) and/or cluster engines 106(1)-(N)), cluster agents 210(1)-(N), and/or databases 120(1)-(N).

Nodes 202(1)-(N) generally represent any type or form of computing device capable of reading computer-executable instructions. Examples of nodes 202(1)-(N) include, without limitation, laptops, desktops, servers, cellular phones, personal digital assistants (PDAs), multimedia players, embedded systems, combinations of one or more of the same, exemplary computing system 610 in FIG. 6, or any other suitable computing devices.

Cluster agents 210(1)-(N) generally represent any type or form of software module capable of communicating and/or coordinating with cluster engine 106 as part of a high-availability computer cluster. Cluster agents 210(1)-(N) may be configured to execute an application as part of the high-availability computer cluster. Cluster agents 210(1)-(N) may also enable cluster engine 106 to control execution of the application within the high-availability computer cluster. In addition, cluster agents 210(1)-(N) may represent at least a portion of high-availability cluster software (e.g., SYMANTEC'S VERITAS CLUSTER SERVER)) installed in computer cluster 208.

Computer cluster 208 generally represents a group of two or more nodes (such as nodes 202(1)-(N)) capable of communicating with one another to collectively perform one or more tasks, such as collectively providing high availability of at least one application and/or collectively executing at least one application. Although not illustrated in FIG. 2, computer cluster 208 may also include one or more shared resources (e.g., one or more storage devices) configured to store data used by such an application and/or a server configured to control execution of such an application by the nodes. Examples of computer cluster 208 include, without limitation, high-availability clusters, load-balancing clusters, Beowolf clusters, high-performance computing clusters, or any other suitable computer clusters.

Server 206 generally represents any type or form of computing device capable of controlling and/or managing nodes within computer clusters. Examples of server 206 include, without limitation, application servers, web servers, and database servers configured to provide various web and/or database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication among nodes 202(1)-(N) and server 206.

Figure 4:
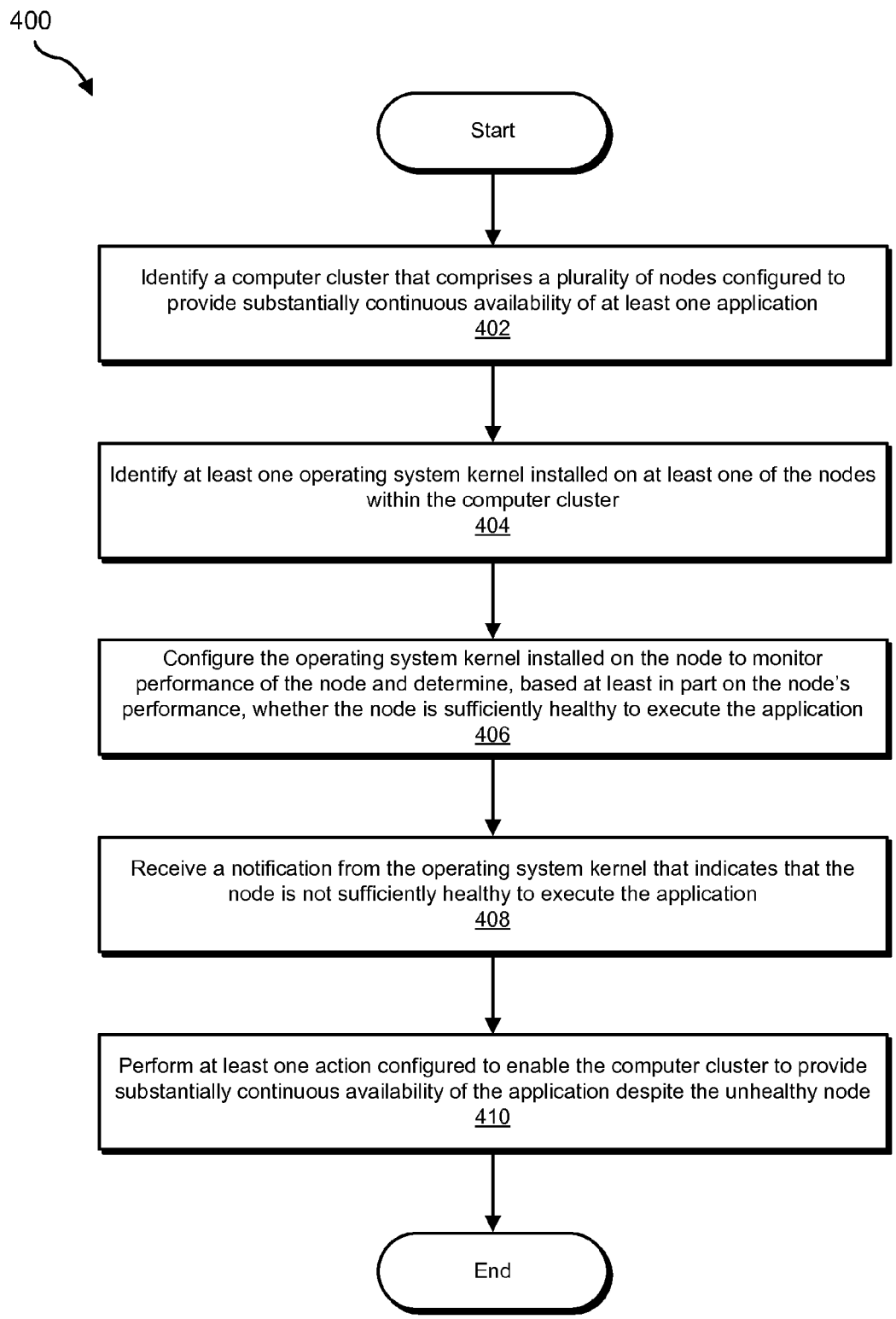
FIG. 4 is a flow diagram of an exemplary method for efficiently determining the health of nodes within computer clusters.

FIG. 4 is a flow diagram of an exemplary computer-implemented method 400 for efficiently determining the health of nodes within computer clusters. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 610 in FIG. 6, and/or portions of exemplary network architecture 700 in FIG. 7.

As illustrated in FIG. 4, at step 402 the various systems described herein may identify a computer cluster that includes a plurality of nodes configured to provide substantially continuous availability of at least one application. For example, identification module 104 may, as part of server 206 (or, alternatively, as part of one or more of nodes 202(1)-(N)), identify computer cluster 208, which includes nodes 202(1)-(N) configured to provide substantially continuous availability of at least one application. In this example, each of nodes 202(1)-(N) may be capable of individually executing the application.

The systems described herein may perform step 402 in a variety of ways. In some examples, identification module 104 may identify computer cluster 208 by accessing information that identifies nodes 202(1)-(N) as part of computer cluster 208. For example, identification module 104 may access database 120 to analyze cluster information 122. In this example, cluster information 122 may identify each of nodes 202(1)-(N) and/or any other devices included in computer cluster 208 by an identification address (such as an IP address or a MAC address), a physical or virtual location, and/or a node registration key. Upon analyzing cluster information 122, identification module 104 may determine that computer cluster 208 includes nodes 202(1)-(N).

In some examples, identification module 104 may identify computer cluster 208 by receiving a notification from each of nodes 202(1)-(N). For example, nodes 202(1)-(N) may each send a notification to identification module 104 to indicate that nodes 202(1)-(N) have been configured to provide substantially continuous availability of the application as part of computer cluster 208. In this example, nodes 202(1)-(N) may each send the notification as part of a boot-up process (initiated, e.g., when nodes 202(1)-(N) are powered on by a user). Identification module 104 may receive each notification from nodes 202(1)-(N) and then determine, based on each received notification, that computer cluster 208 includes nodes 202(1)-(N).

In some examples, identification module 104 may probe nodes 202(1)-(N) via network 204 to determine the configuration of computer cluster 208. For example, identification module 104 may send a request for identification to each of nodes 202(1)-(N). In this example, in response to receiving the request for identification, each of nodes 202(1)-(N) may send information to identification module 104 that identifies the sending node as representing part of computer cluster 208. Identification module 104 may receive this information from nodes 202(1)-(N) and then determine, based on this received information, that the computer cluster 208 includes nodes 202(1)-(N).

Returning to FIG. 4, at step 404 the various systems described herein may identify one or more operating system kernels installed on one or more of the nodes within the computer cluster. For example, identification module 104 may, as part of server 206 (or, alternatively, as part of one or more of nodes 202(1)-(N)), identify one or more operating system kernels installed on one or more of nodes 202(1)-(N) within computer cluster 208. The phrase "operating system kernel," as used herein, generally refers to any type or form of component associated with an operating system that manages resources (such as CPU usage and/or I/O requests) associated with a computing device and/or facilitates communication between the computing device's hardware and software.

The systems described herein may perform step 404 in a variety of ways. In some examples, identification module 104 may identify an operating system kernel installed on node 202(1) and a different operating system kernel installed on node 202(N) by requesting identification of such operating system kernels from the respective operating systems installed on nodes 202(1)-(N). Examples of such operating systems include, without limitation, any versions or variants of MICROSOFT WINDOWS, any versions or variants of WINDOWS MOBILE, any versions or variants of MAC OS, any versions or variants of APPLE'S IOS, any versions or variants of LINUX, any versions or variants of UNIX, any versions or variants of DOS, any versions or variants of AMIGAOS, any versions or variants of GOOGLE CHROME OS, any versions or variants of GOOGLE'S ANDROID, any versions or variants of SOLARIS, any versions or variants of GNU, and/or any other type or form of suitable operating systems.

In one example, identification module 104 may generate a request configured to elicit identification of the operating system kernels installed on nodes 202(1)-(N). In this example, identification module 104 may send this request to the respective operating systems installed on nodes 202(1)-(N). Upon receiving this request, the operating systems may send information that identifies the operating system kernels installed on nodes 202(1)-(N) to identification module 104. Identification module 104 may receive this information from the operating systems and then identify the operating system kernels based on this received information.

In other examples, identification module 104 may identify the operating system kernels installed on nodes 202(1)-(N) by accessing such operating system kernels. For example, identification module 104 may represent part of the high-availability cluster software programmed to interface directly with the operating system kernels installed on nodes 202(1)-(N). In this example, identification module 104 may identify the operating system kernels installed on nodes 202(1)-(N) upon interfacing with such operating system kernels.

In some examples, identification module 104 may also identify cluster engine 106 configured to control which of nodes 202(1)-(N) is to execute the application within computer cluster 208 at a particular point in time. For example, cluster engine 106 may be configured to determine whether to direct node 202(1) or node 202(N) to execute the application upon initiation of computer cluster 208. As will be described in greater detail below, cluster engine 106 may also be configured to determine whether to fail over the application from one node to another node within computer cluster 208.

In some examples, identification module 104 may further identify at least one of cluster agents 210(1)-(N) installed on nodes 202(1)-(N). In such examples, cluster agents 210(1)-(N) installed on nodes 202(1)-(N) may enable cluster engine 106 to control execution of the application by nodes 202(1)-(N). In addition, cluster engine 106 and cluster agents 210(1)-(N) may represent respective portions of the high-availability cluster software (e.g., SYMANTEC'S VERITAS CLUSTER SERVER) distributed throughout computer cluster 208 to facilitate communication and collaboration between server 206 and nodes 202(1)-(N) via network 204.

Returning to FIG. 4, at step 406 the various systems described herein may configure one or more of the operating system kernels installed on the nodes within the computer cluster. For example, cluster engine 106 may, as part of server 206 (or, alternatively, as part of one or more of nodes 202(1)-(N)), configure the operating system kernels installed on nodes 202(1)-(N) within computer cluster 208. In this example, cluster engine 106 may configure each operating system kernel to (1) asynchronously monitor performance of the corresponding node and (2) determine, based at least in part on the corresponding node's performance, whether the corresponding node is sufficiently healthy to execute the application.

The systems described herein may perform step 406 in a variety of ways. In some examples, cluster engine 106 may activate an operating system kernel driver (e.g., SYMANTEC'S ASYCHRONOUS MONITORING FRAMEWORK (AMF)) that interfaces with the operating system kernel to facilitate generating an immediate notification of any changes in the operating state of at least one of cluster agents 210(1)-(N). For example, cluster engine 106 may configure an operating system kernel driver that interfaces with the operating system kernel installed on node 202(1) to generate an immediate notification whenever the operating status of cluster agent 210(1) changes from a running state to a stalled or malfunctioning state. In this example, upon generating the immediate notification, the operating system kernel driver may send the notification to cluster engine 106 to notify cluster engine 106 that node 202(1) is no longer healthy enough to execute the application.

In some examples, cluster engine 106 may identify an identifier associated with at least one of cluster agents 210(1)-(N). For example, cluster engine 106 may identify an identifier associated with cluster agent 210(1) and another identifier associated with cluster agent 210(N). In one example, the identifier associated with cluster agent 210(1) may be the same as the identifier associated with cluster agent 210(N). In another example, the identifier associated with cluster agent 210(1) may be different than the identifier associated with cluster agent 210(N).

In one example, these identifiers may represent process identifiers (PIDs) used by the operating system kernels to identify cluster agents 210(1)-(N). In this example, upon identifying the PIDs associated with cluster agents 210(1)-(N), cluster engine 106 may register such PIDs with the operating system kernel drivers activated on nodes 202(1)-(N). For example, cluster engine 106 may register cluster agent 210(1)'s PID with the operating system kernel driver activated on node 202(1) and cluster agent 210(N)'s PID with the operating system kernel driver activated on node 202(N).

By registering these PIDs with the operating system kernel drivers activated on nodes 202(1)-(N), cluster engine 106 may prompt the operating system kernel drivers to asynchronously monitor the healthiness of cluster agents 210(1)-(N) in order to determine whether nodes 202(1)-(N) are healthy enough to execute the application. If, while monitoring the health of cluster agent 210(1), the operating system kernel driver activated on node 202(1) determines that cluster agent 210(1) appears healthy, then node 202(1) may be healthy enough to execute the application. If, however, the operating system kernel driver activated on node 202(1) determines that cluster agent 210(1) appears unhealthy, then node 202(1) may not be healthy enough to execute the application.

In some examples, such operating system kernel drivers may determine whether cluster agents 210(1)-(N) appear healthy or unhealthy based at least in part on an operating status associated with each of cluster agents 210(1)-(N). This operating status may indicate whether cluster agents 210(1)-(N) are currently running or currently stalled or malfunctioning. For example, the operating system kernel driver activated on node 202(1) may monitor the operating status associated with cluster agent 210(1) to detect any change from a running state to a stalled or malfunctioning state. Upon identifying such a change in the operating status associated with cluster agent 210(1), the operating system kernel driver may immediately notify cluster engine 106 of this change in the operating status.

In one example, the operating system kernel drivers activated on nodes 202(1)-(N) may use an interrupt (e.g., a hardware interrupt) to notify cluster engine 106 of this change in the operating status. For example, cluster engine 106 may configure a hardware interrupt located on node 202(1) to be triggered whenever the operating status associated with cluster agent 210(1) changes from a running state to a stalled or malfunctioning state. In this example, when the hardware interrupt is triggered, the operating system kernel may immediately generate a notification indicating that the operating state associated with cluster agent 210(1) has changed from a running state to a stalled state. The operating system kernel driver activated on node 202(1) may then send this notification to cluster engine 106 to notify cluster engine 106 that node 202(1) is no longer healthy enough to execute the application.

Returning to FIG. 4, at step 408 the various systems described herein may receive a notification from an operating system kernel that indicates that the corresponding node is not sufficiently healthy to execute the application. For example, after configuring the operating system kernels installed on nodes 202(1)-(N), cluster engine 106 may, as part of server 206 (or, alternatively, as part of one or more of nodes 202(1)-(N)), receive a notification from the operating system kernel installed on node 202(1). In this example, the notification received from the operating system kernel installed on node 202(1) may indicate that node 202(1) is not healthy enough to execute the application.

The systems described herein may perform step 408 in a variety of ways. In some examples, cluster engine 106 may receive the notification from the operating system kernel installed on node 202(1) via network 204. In such examples, the received notification may include any type of form of information capable of being used to determine that node 202(1) is not healthy enough to execute the application.

In one example, the received notification may specify that cluster agent 210(1) installed on node 202(1) has experienced a system failure. For example, the received notification may specify that cluster agent 210(1) has stalled and is no longer running on node 202(1). Additionally or alternatively, the received notification may simply indicate that cluster agent 210(1) is unhealthy.

In another example, rather than referring to cluster agent 210(1), the received notification may refer to the healthiness of node 202(1). For example, the received notification may simply indicate that node 202(1) is not healthy enough to execute the application. However, as described above, the operating system kernel installed on node 202(1) may determine that node 202(1) is not healthy enough to execute the application based at least in part on the operating status of cluster agent 210(1).

In some examples, upon receiving the notification from the operating system kernel installed on node 202(1), cluster engine 106 may cross verify the socket (or network) connection between server 206 and node 202(1) to reduce the risk of false positives. For example, cluster engine 106 may send a request for verification to cluster agent 210(1) in an attempt to verify that cluster agent 210(1) has actually stalled on node 202(1). In one example, if cluster engine 106 fails to receive a reply from cluster agent 210(1), cluster engine 106 may more conclusively determine that cluster agent 210(1) is no longer running properly on node 202(1). In another example, if cluster engine 106 receives a reply from cluster agent 210(1), cluster engine 106 may determine that the notification was sent in error and cluster agent 210(1) has not actually stalled on node 202(1).

Returning to FIG. 3, at step 310 the various systems described herein may perform at least one action configured to enable the computer cluster to provide substantially continuous availability of the application despite the unhealthy node. For example, cluster engine 106 may, as part of server 206 (or, alternatively, as part of one or more of nodes 202(1)-(N)), perform at least one action configured to enable computer cluster 208 to provide substantially continuous availability of the application despite the unhealthiness of node 202(1). In this example, cluster engine 106 may perform this action in response to receiving the notification that indicates that node 202(1) is not healthy enough to execute the application.

The systems described herein may perform step 310 in a variety of ways. In one example, cluster engine 106 may restart cluster agent 210(1) in an attempt to restore the health of cluster agent 210(1). For example, cluster engine 106 may send a request configured to restart cluster agent 210(1) to the operating system kernel installed on node 202(1). In this example, node 202(1) may receive the request from cluster engine 106 and then restart cluster agent 210(1) in response to receiving the request. If this restart of cluster agent 210(1) restores the health of cluster agent 210(1), the operating system kernel driver monitoring the health of cluster agent 210(1) may send a notification to cluster engine 106 that indicates that the health of cluster agent 210(1) has been restored.

In another example, in response to receiving the notification indicating that node 202(1) is not healthy enough to execute the application, cluster engine 106 may prevent the node 202(1) from continuing to execute the application. For example, if node 202(1) was executing the application at the point in time that cluster agent 210(1) stalled or started malfunctioning, cluster engine 106 may direct the application to fail over from node 202(1) to node 202(N). In other words, cluster engine 106 may direct node 202(1) to stop executing the application and then select node 202(N) to start executing the application.

In one example, prior to selecting node 202(N) to start executing the application, cluster engine 106 may access cluster information 122 to ensure that cluster agent 210(N) installed on node 202(N) is a healthy backup agent. As illustrated in FIG. 5, cluster information 122 may include various information used to coordinate and/or operate computer cluster 208, such as the type of computer cluster (in this example, "HIGH AVAILABILITY"), each node included in the computer cluster (in this example, "NODES 202(1)-(N)"), each cluster agent installed in the computer cluster (in this example, "CLUSTER AGENTS 210(1)-(N)"), an identifier associated with each cluster agent (in this example, "7457 AND 3421"), the application running on the computer cluster (in this example, "APPLICATION 1"), the agent currently executing the application (in this example, "CLUSTER AGENT 210(1)"), each healthy backup agent (in this example, "CLUSTER AGENT 210(N)"), and each unhealthy backup agent (in this example, "NONE").

In addition, cluster engine 106 may update cluster information 122 as such information becomes outdated due to one or more changes in computer cluster 208. For example, upon directing the application to fail over from node 202(1) to node 202(N), cluster engine 106 may modify cluster information 122 to indicate that node 202(N) is currently executing the application. In this example, cluster engine 106 may also modify cluster information 122 to indicate that cluster agent 210(1) is now an unhealthy backup agent.

In a further example, in response to receiving the notification indicating that node 202(1) is not healthy enough to execute the application, cluster engine 106 may ensure that node 202(1) is not selected to execute the application until node 202(1) becomes healthy enough to execute the application. For example, if node 202(N) was executing the application at the point in time that cluster agent 210(1) stalled, cluster engine 106 may direct the application to fail over from node 202(N) to a different healthy node within computer cluster 208 rather than failing over from node 202(N) to node 202(1). In this example, computer cluster 208 may include various other nodes (not illustrated in FIG. 2) in addition to nodes 202(1)-(N).

Although not illustrated in FIG. 4, exemplary method 400 may include one or more additional steps. In one example, cluster engine 106 may identify a polling mechanism (such as a heartbeat mechanism) installed on at least one of nodes 202(1)-(N). For example, cluster engine 106 may identify a polling mechanism installed on node 202(N) and configured to periodically monitor the performance of node 202(N) by polling the operating system kernel installed on node 202(N). In this example, the polling mechanism may be configured to poll the operating system kernel for evidence of any type or form of system failure capable of impairing the ability of node 202(N) to execute the application.

In a more specific example, cluster engine 106 may configure the polling mechanism to periodically monitor the performance of node 202(N) by polling the operating system kernel for evidence of any type or form of deadlock situation. For example, cluster engine 106 may configure the polling mechanism to check for an unhealthy condition in which multiple processes initiated on node 202(N) are waiting for at least one resource to be released by one another. In this example, cluster engine 106 may configure the polling mechanism to check for the unhealthy condition at a predetermined interval of time (e.g., every 120 seconds). After cluster engine 106 has configured the polling mechanism to check for the unhealthy condition, the polling mechanism may check for the unhealthy condition and determine, based at least in part on the check, whether the node is experiencing the unhealthy condition.

In one example, cluster engine 106 may further configure the operating system kernel installed on node 202(N) (or the operating system kernel driver installed on node 202(N)) to monitor the amount of processes being executed by node 202(N) and determine whether the amount of processes being executed by node 202(N) is above a predetermined threshold. In this example, after cluster engine 106 has further configured the operating system kernel installed on node 202(N), cluster engine 106 may receive a notification from the operating system kernel that indicates that the amount of processes being executed by node 202(N) is above the predetermined threshold. In response to receiving this notification from the operating system kernel installed on node 202(N), cluster engine 106 may dynamically adjust the predetermined interval of time at which the polling mechanism checks for the unhealthy condition (e.g., from every 120 seconds to every 60 seconds).

As explained above, by configuring operating system kernels installed on nodes within a computer cluster to asynchronously monitor performance of the nodes and determine whether the nodes are sufficiently healthy to execute an application, the various systems and methods described herein may enable a cluster engine to nearly instantaneously detect system failures experienced by the nodes instead of waiting for missing periodic heartbeats from such failed nodes. In addition, by so configuring the operating system kernels installed on the nodes within the computer cluster, these systems and methods may help the cluster engine to avoid misdiagnosing the nodes as unhealthy in the event that (1) a healthy node's CPU becomes so overloaded that the healthy node is unable to send a timely heartbeat to the cluster engine or (2) the cluster engine becomes so overloaded that the cluster engine is unable to process a heartbeat received from a healthy node within a predetermined time interval.

Figure 6:
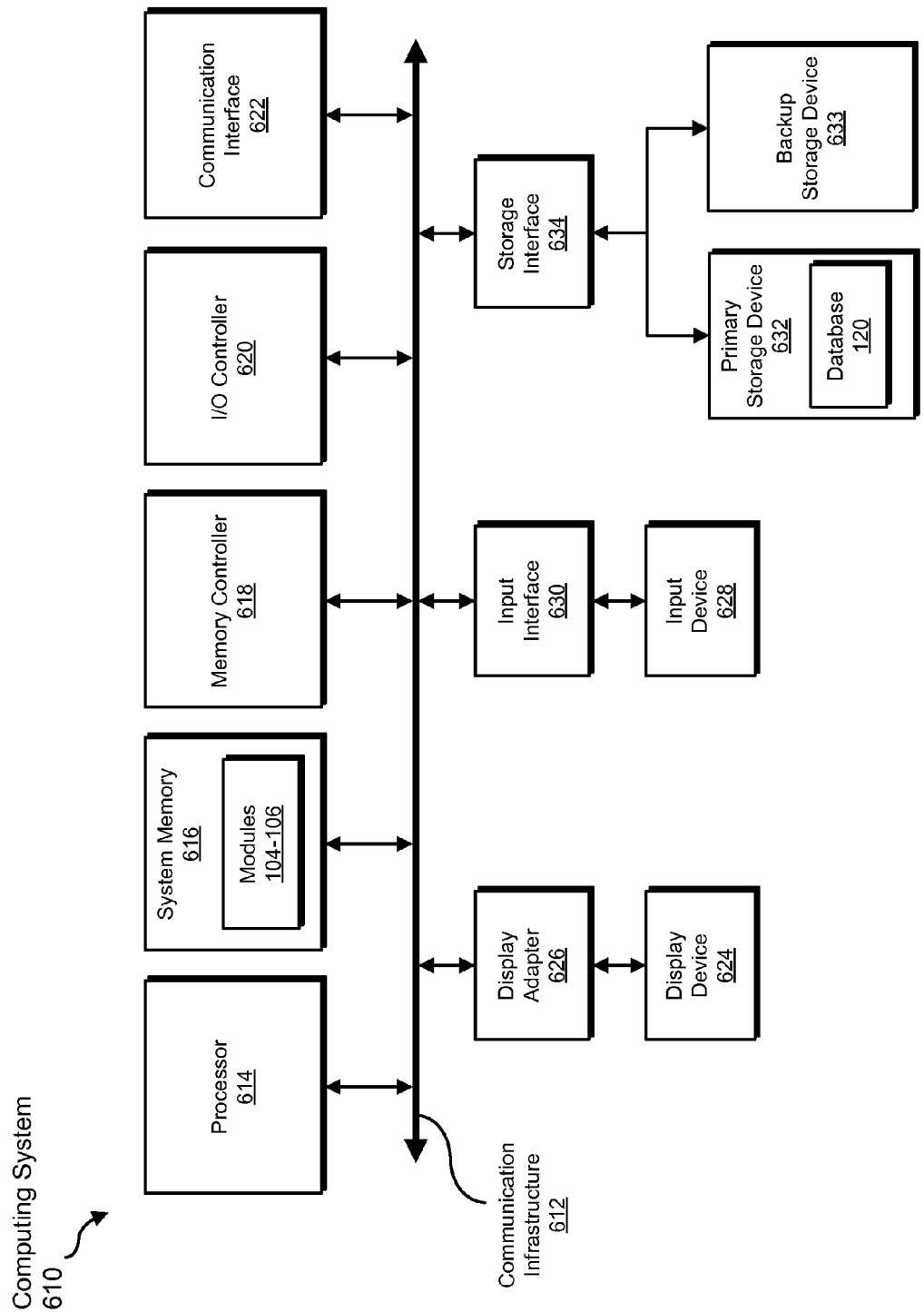
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 510 may perform and/or be a means for performing, either alone or in combination with other elements, one or more of the identifying, configuring, monitoring, determining, receiving, performing, using, registering, restarting, preventing, selecting, ensuring, and adjusting steps described herein. All or a portion of computing system 510 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
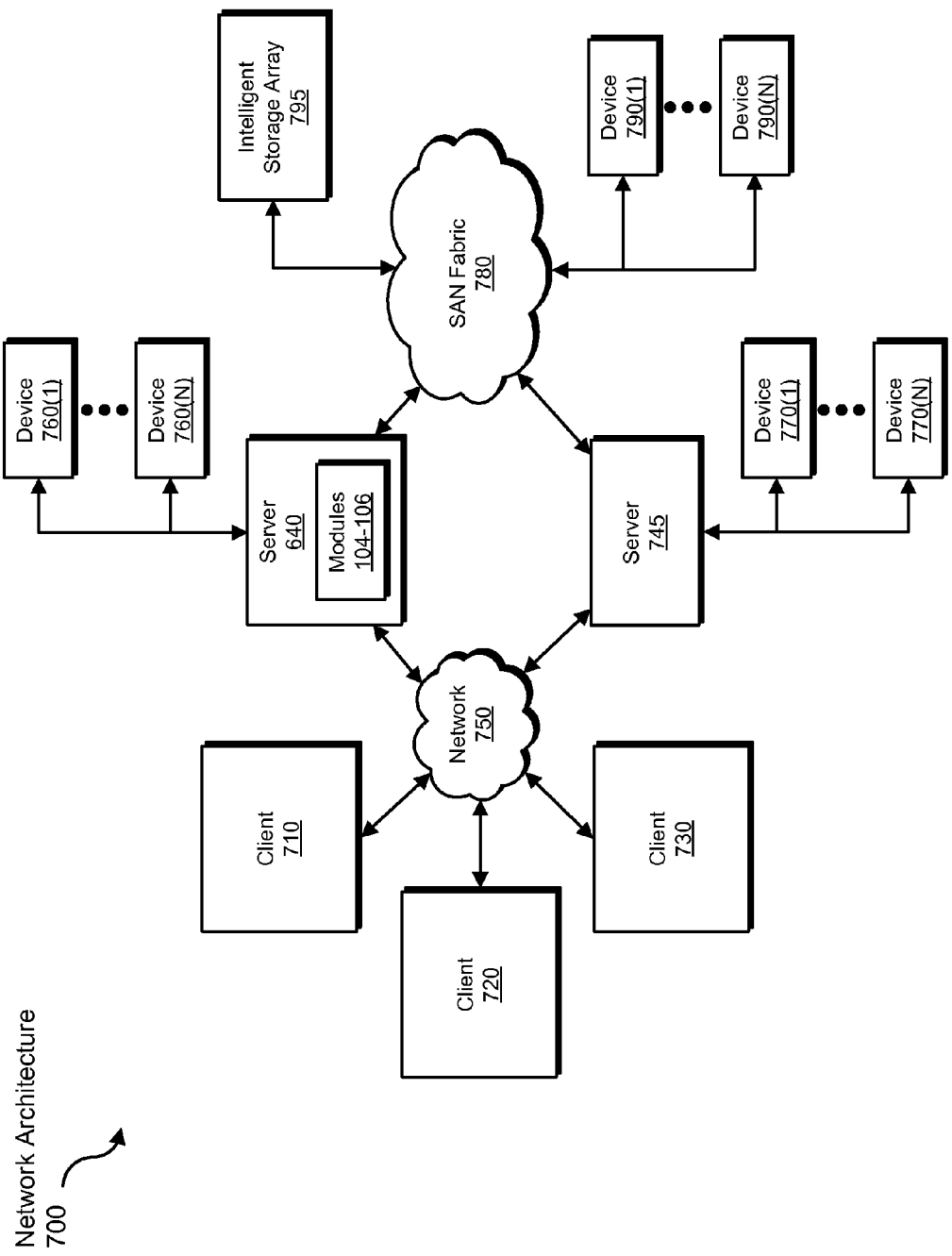
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, configuring, monitoring, determining, receiving, performing, using, registering, restarting, preventing, selecting, ensuring, and adjusting steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for efficiently determining the health of nodes within computer clusters.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a characteristic or property of one or more physical devices (such as one or more of nodes 202(1)-(N) in FIGS. 2 and 3 and/or server 206 in FIG. 2) by failing over an application.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for efficiently determining the health of nodes within computer clusters, at least a portion of the method being performed by a computing device comprising at least one processor, the method comprising:
   identifying a computer cluster that comprises a plurality of nodes configured to provide continuous availability of at least one application;
   identifying a plurality operating system kernels installed on the plurality of nodes, each operating system kernel representing part of an operating system installed on a node within the plurality of nodes and facilitating communication between the node's hardware and software;
   configuring at least one operating system kernel within the plurality of operating system kernels to:
   asynchronously monitor performance of the node on which the operating system kernel is installed;
   determine, based at least in part on the node's performance, whether the node is healthy to execute the application;
   after configuring the operating system kernel installed on the node, receiving a notification generated by the operating system kernel in response to a change in an operating status of the node, the notification indicating that the node is not healthy to execute the application;
   in response to receiving the notification, performing at least one action configured to enable the computer cluster to reduce application downtime despite the unhealthy node.

2. The method of claim 1, further comprising:
   identifying a cluster engine configured to control which of the nodes is to execute the application within the computer cluster;

identifying at least one cluster agent installed on the node that enables the cluster engine to control execution of the application by the node.

3. The method of claim 2, wherein configuring the operating system kernel comprises using the cluster engine to configure the operating system kernel.

4. The method of claim 2, wherein performing the action configured to enable the computer cluster to provide continuous availability of the application comprises using the cluster engine to:
receive the notification from the operating system kernel;
perform the action in response to receiving the notification.

5. The method of claim 2, wherein configuring the operating system kernel to determine whether the node is healthy to execute the application comprises configuring the operating system kernel to:
asynchronously monitor the cluster agent's health;
determine, based at least in part on the cluster agent's health, whether the node is healthy to execute the application.

6. The method of claim 2, wherein configuring the operating system kernel comprises:
identifying an identifier associated with the cluster agent installed on the node;
registering the cluster agent's identifier with the operating system kernel to prompt the operating system kernel to asynchronously monitor the cluster agent's health.

7. The method of claim 2, wherein the action configured to enable the computer cluster to provide continuous availability of the application comprises restarting the cluster agent in an attempt to restore the cluster agent's health.

8. The method of claim 1, wherein the action configured to enable the computer cluster to provide continuous availability of the application comprises:
preventing the unhealthy node from continuing to execute the application;
selecting at least one different node within the computer cluster to begin executing the application.

9. The method of claim 1, wherein the action configured to enable the computer cluster to provide continuous availability of the application comprises ensuring that the unhealthy node is not selected to execute the application until the node becomes healthy to execute the application.

10. The method of claim 1, further comprising:
identifying a polling mechanism installed on the node;
configuring the polling mechanism to:
periodically monitor the node's performance by checking, at a predetermined interval of time, for an unhealthy condition in which a plurality of processes initiated on the node are waiting for at least one resource to be released by one another;
determine, based at least in part on the check for the unhealthy condition, whether the node is experiencing the unhealthy condition.

11. The method of claim 10, further comprising:
further configuring the operating system kernel to:
monitor an amount of processes being executed by the node;
determine whether the amount of processes being executed by the node is above a predetermined threshold;
after further configuring the operating system kernel, receiving a different notification from the operating system kernel that indicates that the amount of processes being executed by the node is above the predetermined threshold;
in response to receiving the different notification, dynamically adjusting the predetermined interval of time at which the polling mechanism checks for the unhealthy condition.

12. A system for determining the healthiness of nodes within computer clusters, the system comprising:
an identification module programmed to:
identify a computer cluster that comprises a plurality of nodes configured to provide continuous availability of at least one application;
identify a plurality of operating system kernels installed on the plurality of nodes, each operating system kernel representing part of an operating system installed on a node within the plurality of nodes and facilitating communication between the node's hardware and software;
a cluster engine programmed to:
configure at least one operating system kernel within the plurality of operating system kernels to:
asynchronously monitor performance of the node on which the operating system is installed;
determine, based at least in part on the node's performance, whether the node is healthy to execute the application;
receive, after configuring the operating system kernel, a notification generated by the operating system kernel in response to a change in an operating status of the node, the notification indicating that the node is not healthy to execute the application;
perform, in response to receiving the notification, at least one action configured to enable the computer cluster to reduce application downtime despite the unhealthy node;
at least one hardware processor configured to execute the identification module and the cluster engine.

13. The system of claim 12, wherein the identification module is programmed to identify at least one cluster agent installed on the node that enables the cluster engine to control execution of the application by the node.

14. The system of claim 13, wherein the cluster engine is programmed to configure the operating system kernel installed on the node to:
asynchronously monitor the cluster agent's health;
determine, based at least in part on the cluster agent's health, whether the node is healthy to execute the application.

15. The system of claim 13, wherein the cluster engine is programmed to:
identify an identifier associated with the cluster agent;
register the cluster agent's identifier with the operating system kernel to prompt the operating system kernel to asynchronously monitor the cluster agent's health.

16. The system of claim 13, wherein the action configured to enable the computer cluster to provide continuous availability of the application comprises restarting the cluster agent in an attempt to restore the cluster agent's health.

17. The system of claim 12, wherein the action configured to enable the computer cluster to provide continuous availability of the application comprises:
preventing the unhealthy node from continuing to execute the application;
selecting at least one different node within the computer cluster to begin executing the application.

18. The system of claim 12, wherein the action configured to enable the computer cluster to provide continuous availability of the application comprises ensuring that the unhealthy node is not selected to execute the application until the node becomes healthy to execute the application.

19. The system of claim 12, wherein:

the identification module is programmed to identify a polling mechanism installed on the node;

the cluster engine is programmed to:

configure the polling mechanism to:

periodically monitor the node's performance by checking, at a predetermined interval of time, for an unhealthy condition in which a plurality of processes initiated on the node are waiting for at least one resource to be released by one another;

determine, based at least in part on the check for the unhealthy condition, whether the node is experiencing the unhealthy condition further configure the operating system kernel to:

monitor an amount of processes being executed by the node;

determine whether the amount of processes being executed by the node is above a predetermined threshold;

receive, after further configuring the operating system kernel, a different notification from the operating system kernel that indicates that the amount of processes being executed by the node is above the predetermined threshold;

dynamically adjust, in response to receiving the different notification, the predetermined interval of time at which the polling mechanism checks for the unhealthy condition.

20. A non-transitory computer-readable-storage medium comprising one or more computer-executable instructions that, when executed by at least one processor of a computing device, cause the computing device to:

identify a computer cluster that comprises a plurality of nodes configured to provide continuous availability of at least one application;

identify a plurality of operating system kernels installed on the plurality of nodes, each operating system kernel representing part of an operating system installed on a node within the plurality of nodes and facilitating communication between the node's hardware and software;

configure at least one operating system kernel within the plurality of operating system kernels to:

asynchronously monitor performance of the node on which the operating system kernel is installed;

determine, based at least in part on the node's performance, whether the node is healthy to execute the application;

receive, after configuring the operating system kernel installed on the node, a notification generated by the operating system kernel in response to a change in an operating status of the node, the notification indicating that the node is not healthy to execute the application;

perform, in response to receiving the notification, at least one action configured to enable the computer cluster to reduce application downtime despite the unhealthy node.

\* \* \* \* \*

UNITED STATES PATENT AND TRADEMARK OFFICE
CERTIFICATE OF CORRECTION

| | | |
|---|---|---|
| PATENT NO. | : 9,148,479 B1 | Page 1 of 1 |
| APPLICATION NO. | : 13/363928 | |
| DATED | : September 29, 2015 | |
| INVENTOR(S) | : Anand Bhalerao et al. | |

It is certified that error appears in the above-identified patent and that said Letters Patent is hereby corrected as shown below:

In the Claims

Claim 1, at column 18, line 44, should read:

identifying a plurality of operating system kernels installed

Claim 19, at column 21, lines 11 to 14, should read:

determine, based at least in part on the check for the unhealthy condition, whether the node is experiencing the unhealthy condition;
further configure the operating system kernel to:

Signed and Sealed this
Twenty-eighth Day of June, 2016

Michelle K. Lee
*Director of the United States Patent and Trademark Office*